(12) United States Patent
Wei et al.

(10) Patent No.: US 7,190,143 B2
(45) Date of Patent: Mar. 13, 2007

(54) PULSE WIDTH MODULATION (PWM) RECTIFIER WITH VARIABLE SWITCHING FREQUENCY

(75) Inventors: Lixiang Wei, Whitefish Bay, WI (US); Richard A. Lukaszewski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/139,216

(22) Filed: May 27, 2005

(65) Prior Publication Data

US 2006/0267542 A1 Nov. 30, 2006

(51) Int. Cl.
*G05B 1/02* (2006.01)
*H02M 5/45* (2006.01)

(52) U.S. Cl. .............. 318/606; 318/807; 318/767; 363/37; 363/40; 363/47; 363/60; 363/61

(58) Field of Classification Search .............. None
See application file for complete search history.

(56) References Cited

U.S. PATENT DOCUMENTS

| | | | | |
|---|---|---|---|---|
| 3,599,864 A | * | 8/1971 | Liddle | 236/48 R |
| 4,465,966 A | * | 8/1984 | Long et al. | 323/348 |
| 4,488,103 A | * | 12/1984 | Morinaga et al. | 318/811 |
| 4,788,485 A | * | 11/1988 | Kawagishi et al. | 318/811 |
| 4,829,416 A | * | 5/1989 | Inaba et al. | 363/41 |
| 4,833,586 A | * | 5/1989 | Inaba et al. | 363/41 |
| 4,894,763 A | * | 1/1990 | Ngo | 363/35 |
| 4,961,130 A | * | 10/1990 | Kirchberg, Jr. | 363/41 |
| 4,977,492 A | * | 12/1990 | Kirchberg et al. | 363/41 |
| 4,984,147 A | * | 1/1991 | Araki | 363/84 |
| 4,994,956 A | * | 2/1991 | Kirchberg et al. | 363/95 |
| 5,001,619 A | * | 3/1991 | Nakajima et al. | 363/41 |
| 5,001,622 A | * | 3/1991 | Kirchberg et al. | 363/95 |
| 5,008,801 A | * | 4/1991 | Glennon | 363/132 |
| 5,034,874 A | * | 7/1991 | Araki | 363/41 |
| 5,043,857 A | * | 8/1991 | Kirchberg et al. | 363/41 |
| 5,053,939 A | * | 10/1991 | Kirchberg et al. | 363/41 |
| 5,111,374 A | * | 5/1992 | Lai et al. | 363/37 |
| 5,140,514 A | * | 8/1992 | Tuusa et al. | 363/81 |
| 5,155,671 A | * | 10/1992 | Inaba et al. | 363/37 |
| 5,311,419 A | * | 5/1994 | Shires | 363/65 |
| 5,317,498 A | * | 5/1994 | Dhyandchand et al. | 363/43 |

(Continued)

OTHER PUBLICATIONS

Hosseini, S. H. and Almaleki, M., "Frequency & Duty Cycle Considerations for Soft-Switching Buck Chopper," IEEE, 2003.*

(Continued)

*Primary Examiner*—Lincoln Donovan
*Assistant Examiner*—Robert W. Horn
(74) *Attorney, Agent, or Firm*—Quarles & Brady LLP; William R. Walbrun

(57) ABSTRACT

A method for controlling a device including a plurality of switching devices operated in accordance with a pulse width modulation technique includes receiving a reference voltage signal associated with a first pair of the switching devices. A switching signal is generated. The first pair of switching devices are controlled based on the reference voltage signal and the switching signal in accordance with the pulse width modulation technique. A frequency of the switching signal is varied based on the value of the reference voltage signal.

20 Claims, 6 Drawing Sheets

U.S. PATENT DOCUMENTS

| | | | | |
|---|---|---|---|---|
| 5,321,598 | A | * | 6/1994 | Moran .......................... 363/41 |
| 5,327,335 | A | * | 7/1994 | Maddali et al. ................ 363/39 |
| 5,491,624 | A | * | 2/1996 | Levran et al. ................. 363/87 |
| 5,563,776 | A | * | 10/1996 | Eck .............................. 363/26 |
| 5,638,263 | A | * | 6/1997 | Opal et al. ..................... 363/65 |
| 5,742,493 | A | * | 4/1998 | Ito et al. ........................ 363/37 |
| 5,767,653 | A | * | 6/1998 | DeFiore et al. ............. 318/811 |
| 5,867,379 | A | * | 2/1999 | Maksimovic et al. ......... 363/89 |
| 5,905,642 | A | * | 5/1999 | Hammond .................... 363/37 |
| 6,005,362 | A | * | 12/1999 | Enjeti et al. ................. 318/479 |
| 6,023,417 | A | * | 2/2000 | Hava et al. .................... 363/41 |
| 6,031,738 | A | * | 2/2000 | Lipo et al. ..................... 363/37 |
| 6,038,152 | A | * | 3/2000 | Baker ........................... 363/89 |
| 6,107,776 | A | * | 8/2000 | Nakazawa ................... 318/811 |
| 6,108,221 | A | * | 8/2000 | Takada et al. ................. 363/41 |
| 6,130,832 | A | * | 10/2000 | Julian .......................... 363/127 |
| 6,134,127 | A | * | 10/2000 | Kirchberg ..................... 363/41 |
| 6,166,929 | A | * | 12/2000 | Ma et al. ....................... 363/37 |
| 6,185,115 | B1 | * | 2/2001 | Sul et al. ....................... 363/37 |
| 6,204,649 | B1 | * | 3/2001 | Roman ....................... 323/282 |
| 6,239,585 | B1 | * | 5/2001 | Buono ........................ 323/282 |
| 6,239,997 | B1 | * | 5/2001 | Deng ............................ 363/95 |
| 6,297,980 | B1 | * | 10/2001 | Smedley et al. .............. 363/89 |
| 6,301,130 | B1 | * | 10/2001 | Aiello et al. ................... 363/37 |
| 6,366,483 | B1 | * | 4/2002 | Ma et al. ....................... 363/87 |
| 6,370,050 | B1 | * | 4/2002 | Peng et al. .................... 363/98 |
| 6,442,047 | B1 | * | 8/2002 | Cohen .......................... 363/17 |
| 6,507,505 | B2 | * | 1/2003 | Oka et al. ...................... 363/47 |
| 6,556,464 | B2 | * | 4/2003 | Sakai et al. .................. 363/132 |
| 6,566,764 | B2 | * | 5/2003 | Rebsdorf et al. ............. 290/44 |
| 6,594,164 | B2 | * | 7/2003 | Suzuki .......................... 363/69 |
| 6,657,417 | B1 | * | 12/2003 | Hwang ....................... 323/222 |
| 6,690,592 | B2 | * | 2/2004 | Link ............................. 363/98 |
| 6,728,118 | B1 | * | 4/2004 | Chen et al. .................... 363/24 |
| 6,757,185 | B2 | * | 6/2004 | Rojas Romero ............. 363/89 |
| 6,781,356 | B1 | * | 8/2004 | Yang et al. .................. 323/282 |
| 6,795,323 | B2 | * | 9/2004 | Tanaka et al. ................. 363/41 |
| 6,800,965 | B1 | * | 10/2004 | Turner et al. ................ 307/128 |
| 6,801,441 | B2 | * | 10/2004 | Salama ......................... 363/37 |
| 6,822,588 | B1 | * | 11/2004 | Marshall et al. .............. 341/50 |
| 6,822,884 | B1 | * | 11/2004 | Rosenthal et al. ............ 363/59 |
| 6,845,020 | B2 | * | 1/2005 | Deng et al. .................... 363/37 |
| 6,850,424 | B2 | * | 2/2005 | Baudelot et al. .............. 363/37 |
| 6,850,426 | B2 | * | 2/2005 | Kojori et al. ................ 363/123 |
| 6,885,171 | B2 | * | 4/2005 | Karppinen et al. ......... 323/207 |
| 6,946,819 | B2 | * | 9/2005 | Fagnani et al. .............. 323/207 |
| 6,963,496 | B2 | * | 11/2005 | Bimbaud ................. 363/21.16 |
| 6,965,502 | B2 | * | 11/2005 | Duffy et al. ................... 361/18 |
| 6,969,977 | B1 | * | 11/2005 | Smith ......................... 323/222 |
| 6,975,098 | B2 | * | 12/2005 | Vinciarelli .................. 323/266 |
| 7,035,124 | B2 | * | 4/2006 | Chadwick et al. ............ 363/40 |
| 7,049,870 | B2 | * | 5/2006 | Brown et al. ................ 327/172 |
| 2004/0105288 | A1 | * | 6/2004 | Watanabe et al. ........... 363/132 |
| 2005/0068001 | A1 | * | 3/2005 | Skaug et al. ................. 318/807 |
| 2005/0151571 | A1 | * | 7/2005 | Brown et al. ................ 327/172 |
| 2005/0207195 | A1 | * | 9/2005 | Olsson et al. ............... 363/125 |
| 2006/0044848 | A1 | * | 3/2006 | Suzuki et al. ................. 363/37 |
| 2006/0091870 | A1 | * | 5/2006 | Yoshida et al. ............. 323/282 |
| 2006/0113974 | A1 | * | 6/2006 | Kan et al. .................... 323/282 |
| 2006/0114702 | A1 | * | 6/2006 | Yamada et al. ............. 363/132 |
| 2006/0133120 | A1 | * | 6/2006 | Sato et al. ..................... 363/37 |

OTHER PUBLICATIONS

Giuseppe S. Buja, et al., Direct Torque Control of PWM Inverter-Fed AC Motors—A Survey, IEEE Transactions on Industrial Electronics, vol. 51, No. 4, Aug. 2004, pp. 744-757.

Steffan Hansen, et al., Sensorless Control Strategies for PWM Rectifier, copyright 2000 IEEE.

Johann W. Kolar, et al., Influence of the Modulation Method on the Conduction and Switching Losses of a PWM Converter System, IEEE Transactions on Industry Applications, vol. 27, No. 6, Nov./Dec. 1991, pp. 1063-1075.

Ahmet M. Hava, et al., A High-Performance Generalized Discontinuous PWM Algorithm, IEEE Transactions on Industry Applications, vol. 34, No. 5, Sep./Oct. 1998, pp. 1059-1071.

Dae-Woong Chung et al., Minimum-Loss PWM Strategy for 3-Phase PWM Rectifier, School of Electrical Engineering, Seoul National University, Seoul, Korea, copyright 1997 IEEE, pp. 1020-1026.

Di Zhao, et al., Switching Loss Characteristics of Sequences Involving Active State Division in Space Vector Based PWM, copyright 2004 IEEE.

Andrzej M. Trzynadlowski, et al., Minimum-Loss Vector PWM Strategy for Three-Phase Inverters, IEEE Transactions on Power Electronics, vol. 9, No. 1, Jan. 1994, pp. 26-34.

Heinz Willi Van Der Broeck, et al., Analysis and Realization of a Pulsewidth Modulator Based on Voltage Space Vectors, IEEE Transactions on Industry Applications, vol. 24, No. 1, Jan./Feb. 1988, pp. 142-150.

Andrzej. M. Trzynadlowski, et al., Space Vector PWM Technique with Minimum Switching Losses and a Variable Pulse Rate, IEEE Transactions on Industrial Electronics, vol. 44, No. 2, Apr. 1997, pp. 173-181.

* cited by examiner

PULSE WIDTH MODULATION (PWM) RECTIFIER WITH VARIABLE SWITCHING FREQUENCY

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to power conversion and conditioning and, more particularly, to a PWM rectifier with a variable switching frequency.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Power plants are linked to power consuming facilities (e.g., buildings, factories, etc.) via utility grids designed so as to be extremely efficient in delivering massive amounts of power. To facilitate efficient distribution, power is delivered over long distances as low frequency three-phase AC current.

Despite being distributable efficiently, low frequency AC current is sometimes not suitable for end use in consuming facilities. Thus, prior to end use power delivered by a utility has to be converted to a useable form. To this end a typical power "conditioning" configuration includes an AC-to-DC rectifier that converts the utility AC power to DC across positive and negative DC buses (i.e., across a DC link) and an inverter linked to the DC link that converts the DC power back to three phase AC power having an end-useable form (e.g., three phase relatively high frequency AC voltage). A controller controls the inverter in a manner calculated to provide voltage waveforms required by the consuming facility.

Motors and their associated loads are one type of common inductive load employed at many consuming facilities. While the present invention is applicable to different load types, to simplify this explanation, an exemplary motor with an associated load will be assumed. To drive a motor an inverter includes a plurality of switches that can be controlled to link and delink the positive and negative DC buses to motor supply lines. The linking-delinking sequence causes voltage pulses on the motor supply lines that together define alternating voltage waveforms. When controlled correctly, the waveforms cooperate to generate a rotating magnetic field inside a motor stator core. The magnetic field induces (hence the nomenclature "induction motor") a field in motor rotor windings. The rotor field is attracted to the rotating stator field and hence the rotor rotates within the stator core.

A pulse width modulation (PWM) rectifier is one type of rectifier employed in a high performance adjustable speed drive (ASD) where regeneration or high quality input current is required. As AC drives proliferate, equipment system specifications limiting the amount of harmonic current injected into the utility grid are becoming more common and thus solicit cost effective harmonic mitigation solutions. System specifications are often written so measured total harmonic distortion at the Point of Common Coupling (PCC) complies with the maximum low voltage total harmonic distortion levels (THDV) and system classification of IEEE 519. The PCC is usually at the power metering point where other customers connect to the common line voltage but may also be within a plant where linear and non-linear loads are connected. Diode rectifiers typically encounter difficulty in attempting to met the harmonic distortion constraints.

Typical PWM rectifiers are better able to meet the harmonic distortion requirements, but are more costly than conventional diode rectifiers. This cost differential has typically precluded the use of PWM rectifiers in medium performance applications. As compared to a diode rectifier, a PWM rectifier requires an additional input LCL filter on the source side, main inductors on the conversion side, and switching devices used to implement the PWM technique. Two parameters associated with the performance of PWM rectifiers are ripple current in the main inductors and switching losses. Significant ripple current results in a higher required rating for the main inductors, thereby increasing their cost. Various techniques have been employed to improve the performance of PWM circuits. Space vector PWM control (SVPWM) and discrete PWM (DPWM) are two techniques commonly used PWM techniques. In a DPWM system, only two phases are modulated at any given time, thereby reducing switching losses to 50% as compared to SVPWM for a unity power factor condition. However, both techniques show significant ripple current, necessitating a larger, more expensive main inductor.

It would be desirable for a PWM rectifier to exhibit lower ripple currents, thereby reducing the cost of the rectifier and widening its range of applications.

BRIEF SUMMARY OF THE INVENTION

The present inventors have recognized that main inductor ripple current in a PWM rectifier varies depending on the value of the reference voltage for each phase. The ripple current reaches its maximum value when the reference voltage for the particular phase reaches zero, while the ripple current lessens when the reference voltage reaches its maximum value. By varying the switching frequency of the rectifier depending on the value of the reference voltage, the ripple current and switching losses may be reduced. This performance increase lessens the rating requirements of the inductors and transistor switching devices employed in the rectifier, thereby reducing its cost and expanding its range of applications. The variable frequency pulse width modulation technique is may be used in other applications in addition to rectifier applications.

One aspect of the present invention is seen in a method for controlling a device including a plurality of switching devices operated in accordance with a pulse width modulation technique. The method includes receiving a reference voltage signal associated with a first pair of the switching devices. A switching signal is generated. The first pair of switching devices are controlled based on the reference voltage signal and the switching signal in accordance with the pulse width modulation technique. A frequency of the switching signal is varied based on the value of the reference voltage signal.

Another aspect of the present invention is seen in a rectifier operable to receive a plurality of input voltages each having a phase. The rectifier includes a positive bus, a negative bus, a plurality of main inductors, each coupled to one of the input voltage phases, a switching circuit, and a controller. The switching circuit is coupled between the positive and negative buses and the main inductors and includes a plurality of pairs of switching devices, each pair being associated with one of the input voltage phases. The controller is operable to control the pairs of switching devices for each phase based on a reference voltage signal for each phase and a switching signal for each phase. The controller varies the frequency of the switching signal for a selected phase based on the value of the reference voltage signal for the selected phase.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
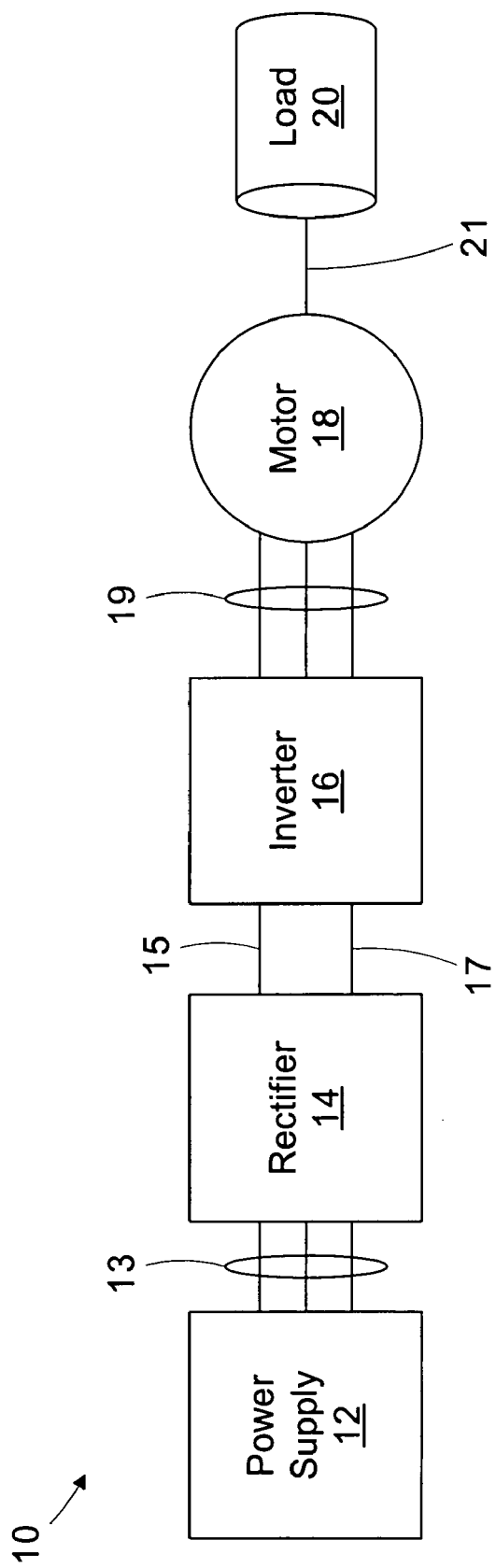
FIG. 1 is a simplified diagram of a motor control system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Referring now to the drawings wherein like reference numbers correspond to similar components throughout the several views and, specifically, referring to FIG. 1, the present invention shall be described in the context of an exemplary motor control system 10. The motor control system 10 includes a power supply 12, a rectifier 14, an inverter 16, a three-phase motor 18, a load 20, and a plurality of lines and buses that link the aforementioned components together in the manner described hereinafter.

The power supply 12 typically provides a three phase AC voltage received from a utility grid over lines 13. The nominal line voltage of the power supply 12 may vary depending on the particular implementation. The rectifier 14 receives 3-phase power from the power supply 12 and converts the AC power to DC. The inverter 16 is positioned between positive and negative DC buses 15, 17 of the rectifier 14. Although not illustrated, as is well known in the motor controls industry, the inverter 16 includes a plurality of switching devices (e.g., BJT's, etc.) that are positioned between the positive and negative DC buses 15, 17 and supply lines 19 such that by opening and closing specific combinations of the inverter switches, positive and negative DC voltage pulses are generated on each of the supply lines 19. By opening and closing the inverter switches in specific sequences, AC voltages having controllable amplitudes and frequencies can be generated on each of the supply lines 19.

Each of the lines 19 is linked to a separate one of three-phase windings (not separately numbered or illustrated) of the motor 18. By providing known sequences of AC voltages across the motor windings, varying currents are caused therein which induce a rotating magnetic field within a motor stator core. A motor rotor (not illustrated) which is linked to a motor shaft 21 resides within the motor core. The rotor includes either bars or windings or both and, when the changing and rotating magnetic field within the stator core intersects the rotor, currents are induced within the rotor and the rotor currents in turn cause a rotor magnetic field within the stator core. The rotor field is attracted by the rotating stator field and hence the rotor rotates within the stator core. The load 20 is attached via shaft 21 to the rotor and therefore, when the rotor rotates, load 20 also tends to rotate in the same direction.

Although the rectifier 14 of the present invention is described as it may be used to provide DC power for the inverter 16 for controlling the motor 18, the application of the present invention is not limited to a motor application. For example, the rectifier 14 may be connected to some other load, such as a common DC bus load, which in turn is connected to a group of inverters.

Figure 2:
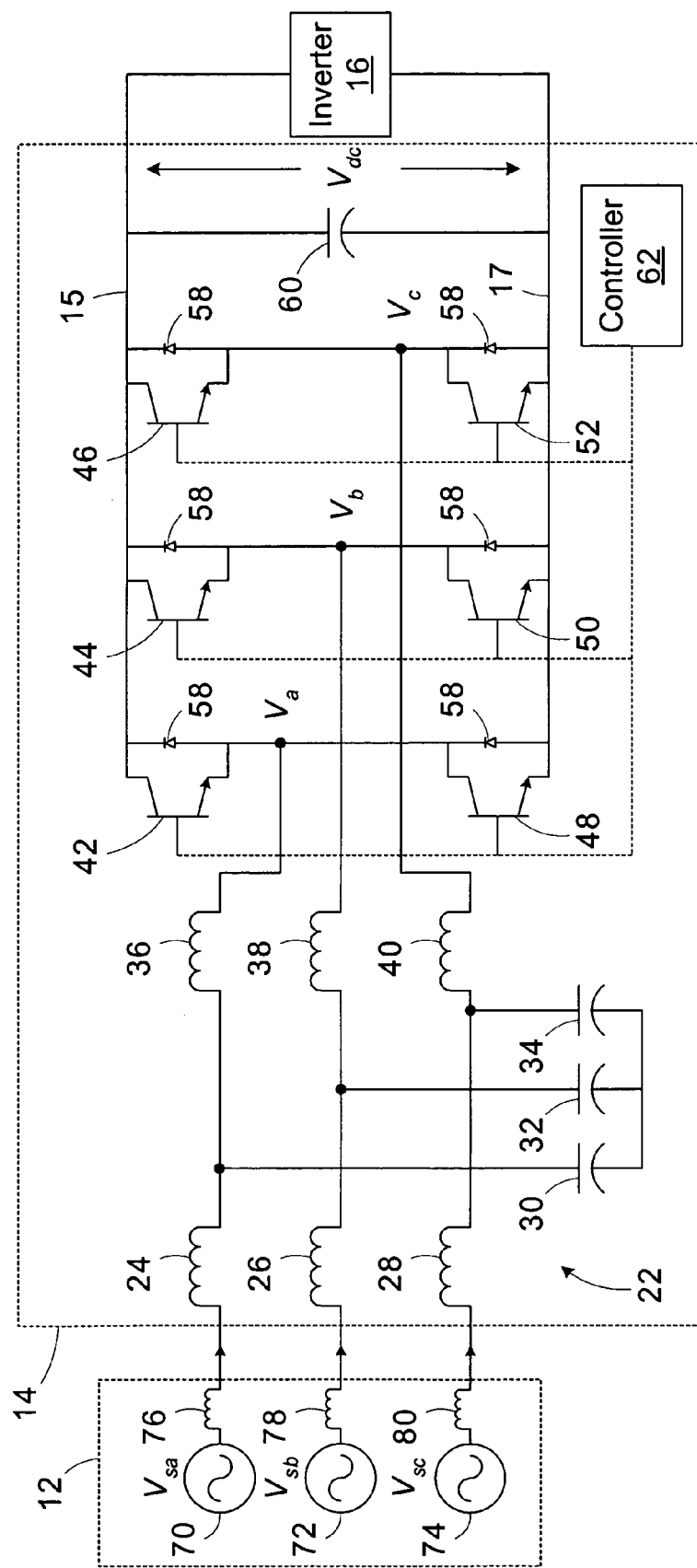
FIG. 2 is a diagram of a rectifier in the motor control system of FIG. 1.

Turning now to FIG. 2, a circuit diagram of the rectifier 14 interfacing with the power supply 12 and the inverter 16 is provided. The rectifier 14 includes an LCL filter 22 including filter inductors 24, 26, 28 and filter capacitors 30, 32, 34; main inductors 36, 38, 40; upper transistors 42, 44, 46 and lower transistors 48, 50, 52 coupled between the positive and negative buses 15, 17; bypass diodes 58 coupled across the transistors 36, 38, 40, 42, 44, 46; a bus capacitor 60 coupled between the positive and negative buses 15, 17; and a controller 62. The power supply 12 includes voltage sources 70, 72, 74, representing the three phase AC power supplied by the power supply 12. Inductors 76, 78, 80 represent the source inductance of the power supply 12.

The rectifier 14 operates in a PWM mode to convert the alternating current (AC) provided by the power supply 12 to direct current (DC) across the buses 15, 17. The controller 62 controls the upper and lower transistors to selectively couple the voltage sources 70, 72, 74 across the main inductors 36, 38, 40 in accordance with the PWM technique. The transistors 42, 48 define a first pair associated with the "A" phase supplied by voltage source 70, the transistors 44, 50 define a second pair associated with the "B" phase supplied by voltage source 72, and the transistors 46, 52 define a third pair associated with the "C" phase supplied by voltage source 74. The LCL filter 22 mitigates ripple current present in the main inductors 36, 38, 40.

In the illustrated embodiment, the controller 62 implements a variable frequency PWM (VFPWM) technique where the frequency of the switching function used to control the transistors 36, 38, 40, 42, 44, 46 is varied for each phase depending on the state of the phase reference signal.

The definition of converter voltage/current space vectors for the rectifier 14 is given by:

$$\vec{X} = \sqrt{\frac{2}{3}} (X_a + \alpha x_b + \alpha^2 x_c); \quad \alpha = \left(-\frac{1}{2} + j\frac{\sqrt{3}}{2}\right) \quad (1)$$

where x is a variable that can represent either the phase voltage or the phase current of the rectifier 12. If purely sinusoidal converter output voltage is provided by the rectifier 12, then the rectifier side voltage command can be represented by:

$$\vec{V}^* = V^* e^{j\theta_a} = \frac{2}{3} k \cdot V_{dc} \cdot e^{j\theta_a}; \theta_a = \omega_n t \quad (2)$$

where, k∈[0,1] is the modulation index level of the rectifier. $V_{dc}$ is the DC bus capacitor 60 voltage, which is generally controlled to a constant value.

The rectifier side source voltage and current vectors are:

$$\vec{V}_s = V_m e^{j(\theta_a + \theta_v)}; \vec{i}_s = I_m e^{j(\theta_a + \theta_i)} \quad (3)$$

where, $V_m$ and $I_m$ are the voltage and current amplitude and $\theta_v$ and $\theta_i$ are the initial angle of the source voltage/current.

Figure 3:
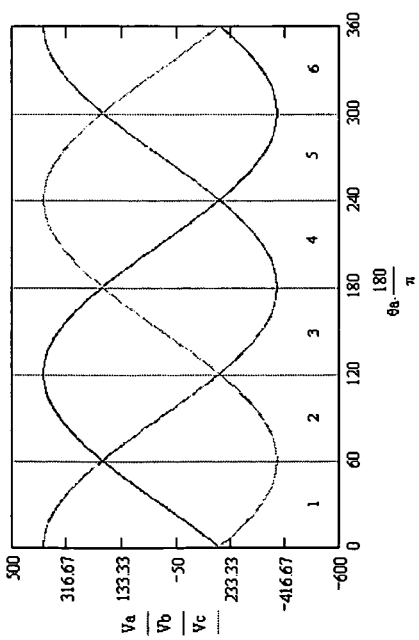
FIG. 3 is a diagram illustrating voltage reference signals $V_a$, $V_b$, $V_c$.

Turning now to FIG. 3, a diagram illustrating the voltage reference signals $V_a$, $V_b$, $V_c$. Six intervals are defined based on the values of the reference signals. For purposes of illustration, the following example limits the analysis of the system by assuming that the angle of the voltage command is limited to interval 2 of FIG. 3:

$$\theta_a \in \left[\frac{\pi}{3}, \frac{2\pi}{3}\right] \quad (4)$$

Subsequently, the duty ratio of each phase leg applying a SVPWM technique can be calculated as shown in Table. 1.

TABLE 1

| | duty ratios of SVPWM/DPWM | | |
|---|---|---|---|
| | SVPWM | DPWM | DPWM |
| Duty ratio | $\theta_a \in \left[\frac{\pi}{3}, \frac{2\pi}{3}\right]$ | $\theta_a \in \left[\frac{\pi}{3}, \frac{\pi}{2}\right]$ | $\theta_a \in \left[\frac{\pi}{2}, \frac{2\pi}{3}\right]$ |
| $d_a$ | $\frac{1}{2} + \frac{\sqrt{3}k}{2} \cdot \cos(\theta_a)$ | $k \cdot \sin(\theta_a + \frac{\pi}{3})$ | $1 + k \cdot \sin(\frac{\pi}{3} - \theta_a)$ |
| $d_b$ | $\frac{1}{2} + \frac{k}{2} \cdot \sin(\theta_a)$ | $k \cdot \sin(\theta_a)$ | 1 |
| $d_c$ | $\frac{1}{2} - \frac{k}{2} \cdot \sin(\theta_a)$ | 0 | $1 - k \cdot \sin(\theta_a)$ |

For calculating the switching losses related to different modulation methods, it is generally assumed that the switching energy losses in one switching cycle are proportional to the AC side current:

$$E_{sw}(i_x) = k i_x = k I_m \cos(\theta_x) \quad (5)$$

where, k is a constant decided by the transistor (IGBT) and diode characteristics and the DC bus voltage and x∈{a, b, c} is one of the three rectifier phases.

To determine the switching losses of the rectifier 12, the switching times of each cycle are added together. The switching losses of a rectifier leg using a SVPWM scheme can be calculated as:

$$P_{sw}(i_x) = \frac{2}{\pi} \cdot k f_s \cdot I_m \quad (6)$$

Similarly, the switching losses of the rectifier leg at unity converter side power factor using a DPWM scheme is:

$$P_{sw}(i_x) = \frac{2\sin(\frac{\pi}{6})}{\pi} \cdot k f_s \cdot I_m = \frac{k}{\pi} \cdot f_s \cdot I_m \quad (7)$$

As seen in Equation 7, the switching losses of the DPWM technique are only 50% of that for the SVPWM technique under the same switching frequency under unity power factor conditions.

It has been determined that the ripple current for a particular phase reaches its maximum value when its reference voltage reaches zero, while the ripple current flattens out when the reference voltage reaches its maximum value. To reduce the ripple current, the controller 62 implements a variable switching frequency technique that adopts a higher switching frequency for a given phase when its reference voltage approaches zero. This higher switching frequency is generally several times higher than the base switching frequency (e.g., N=2 to 6 times the switching frequency).

Figure 4:
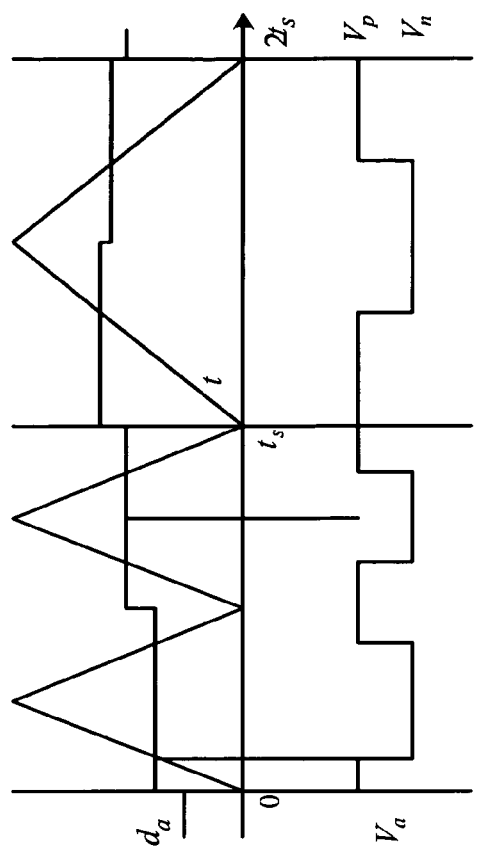
FIG. 4 is a diagram illustrating the duty ratio ($d_a$) of one voltage leg and its leg voltage ($V_a$) during a transition from one switching frequency to a second, higher frequency.

Referring now to FIG. 4, a diagram illustrating the duty ratio ($d_a$) of one leg and its leg voltage ($V_a$) during a transition from one switching frequency to a second, higher frequency (N=2) is provided. In the example of FIG. 4, the switching frequency is doubled in the first cycle and becomes normal in the second cycle.

The controller 62 may implement a variable switching frequency with either a SVPWM or a DPWM scheme. Generally, the duty ratio of a VFPWM technique is the same as that of the conventional SVPWM technique. The switching frequency of one leg for the SVPWM applying variable switching frequency (VFPWM) can be defined as:

$$f_x \begin{cases} Nf_s & |\cos(\theta_x)| < \cos(90 - \delta) \\ f_s & |\cos(\theta_x)| \geq \cos(90 - \delta) \end{cases} \quad (8)$$

where, $\theta_x$ is the electrical angle of phase x, $\delta \in (0, \pi/6)$ is a constant that can be determined by the modulation index level, and N is an integer number (N>=2) representing the frequency multiple.

Similarly, applying a variable frequency technique to DPWM (VFDPWM) yields a switching frequency function of:

$$f_x \begin{cases} Nf_s & |\cos(\theta_x)| < \cos(90 - \delta) \\ f_s & 0.866 > |\cos(\theta_x)| \geq \cos(90 - \delta) \\ 0 & |\cos(\theta_x)| \geq 0.866 \end{cases} \quad (9)$$

Figure 5:
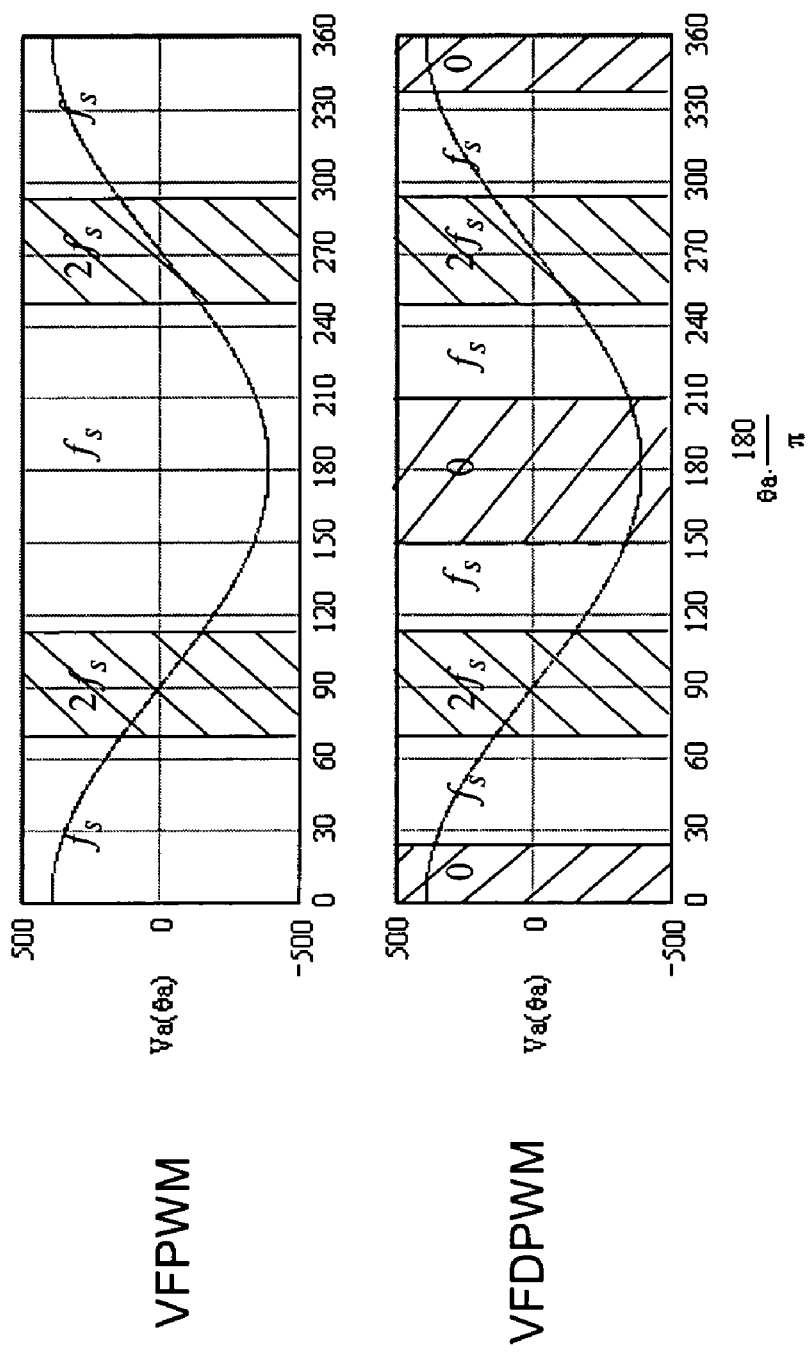
FIG. 5 is a diagram illustrating the switching frequencies as a function of synchronization angle for a frequency multiplier of two.

FIG. 5 is a diagram illustrating the switching frequencies of phase A as a function of synchronization angle for a frequency multiplier of two (i.e., N=2), as described by Equations 8 and 9. Generally, the analog signal of the system as well as the duty ratio of each phase is sampled every half cycle of the switching period.

Although only two different frequencies are used in the examples outlined by Equations 8 and 9, and illustrated in FIG. 5, it is contemplated that different frequency intervals may be defined. For example the switching frequency may change by smaller steps using more intervals.

From equations (8) and (9), it may be seen that the VFDPWM can be regarded as a special case of the VFPWM method. To simplify the analysis, only $\delta = \pi/6$ is discussed in this example.

The switching losses can be determined when a unity power factor is applied at rectifier side. For the VFPWM, the switching losses are:

$$P_{sw}(i_x) = \frac{2[N - (N-1)\cos\delta]}{\pi} \cdot kf_s \cdot I_m \quad (10)$$

For the VFDPWM technique, the switching losses are:

$$P_{sw}(i_x) = \frac{2[\sin(\frac{\pi}{6}) + (N-1)(1 - \cos\delta)]}{\pi} \cdot kf_s \cdot I_m \quad (11)$$
$$= \frac{2N - 1 - (2N - 2)\cos\delta}{\pi} \cdot kf_s \cdot I_m$$

The switching losses using the variable frequency PWM techniques are reduced to around 60% of the switching losses of the PWM techniques with static switching frequencies.

Figures 6A, 6B:
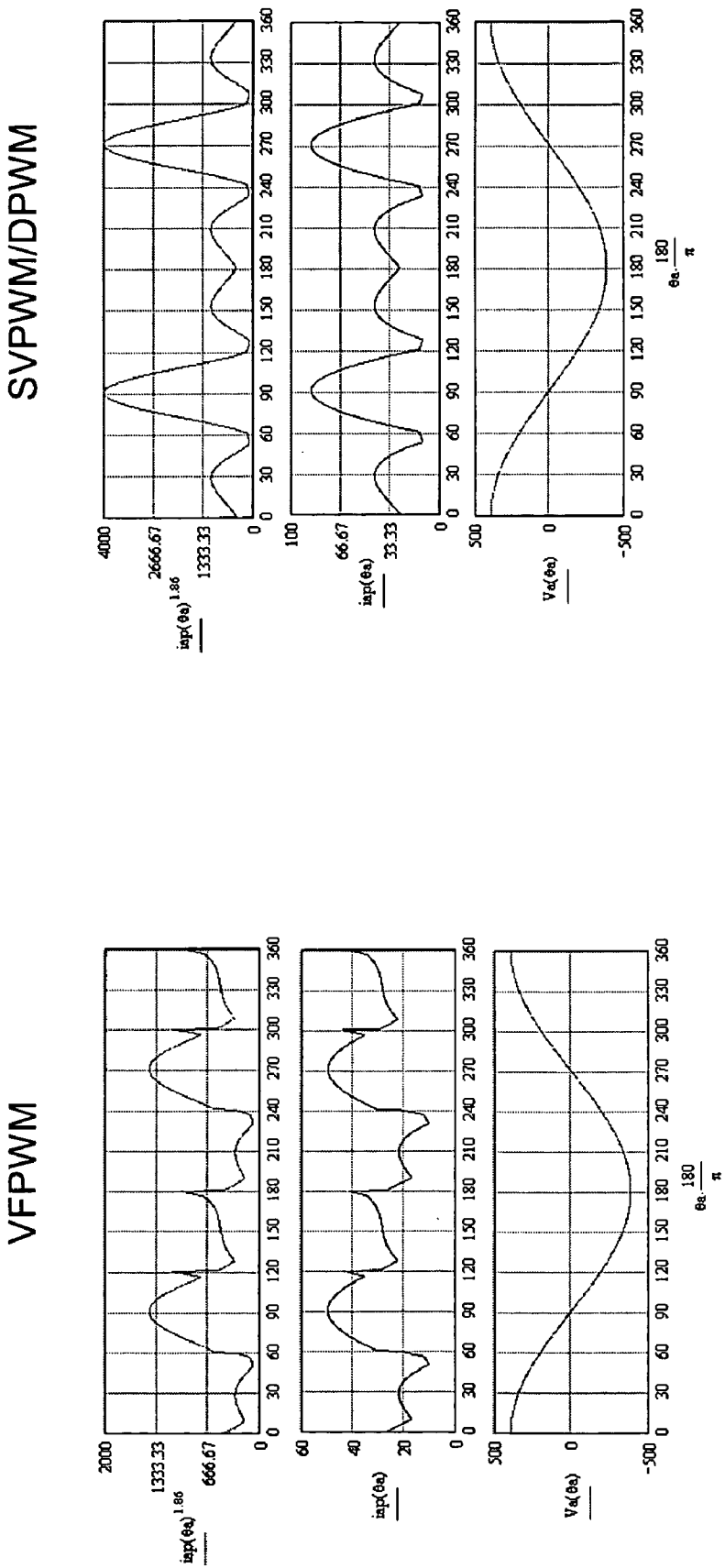
FIGS. 6A and 6B are diagrams illustrating ripple currents for the variable frequency PWM technique of the present invention and the prior art static frequency PWM technique, respectively.

Turning now to FIGS. 6A and 6B, the ripple currents for the variable frequency PWM technique (FIG. 6A) of the present invention and the static frequency PWM (FIG. 6B) are shown. For the comparison, the modulation index is 0.95 and the frequency multiple, N, is two. The ripple currents are the same for the SVPWM and DPWM techniques. Comparing the ripple currents, it is evident that the ripple current is reduced by approximately 50% by implementing the variable switching frequency technique. A reduced ripple current equates to reduced ratings for the transistors 36, 38, 40, 42, 44, 46, and reduced core losses in the main inductors 36, 38, 40. A common material used to implement the main inductors 36, 38, 40 is a silicone steel construction with thick lamination (e.g., 11–14 mil). With silicone steel, the major component of the core losses of the main inductors 36, 38, 40 are generated by the ripple current.

For example, for 12 mil silicone steel operating in a linear region, the core losses can be approximated as $$P_{core} \approx k \cdot f_s^\alpha \cdot B_{ap}^\beta \approx k^* \cdot f_s^\alpha \cdot i_{ap}^\beta \quad (12)$$

where, k, and k* are constants determined based on the weight and materials of the core, α and β are constants determined by the core material of the main inductors 36, 38, 40 (i.e., α=1.68 and β=1.86 for 12 mil silicone steel), $f_s$ is the switching frequency, and $B_{ap}$ is the hysteresis flux ripple in one switching cycle. Still referring to FIGS. 6A and 6B, curves of $i_{ap}^{1.86}$ as a function of command voltage angle are also provided. It can be seen that the core losses are almost tripled when the reference voltage reaches 0 as compared to when the reference voltage reaches it peak value. Hence, increasing the switching frequency when voltage reference is low helps to optimize the main inductor core losses by reducing the magnitude of the ripple current.

Figure 7:
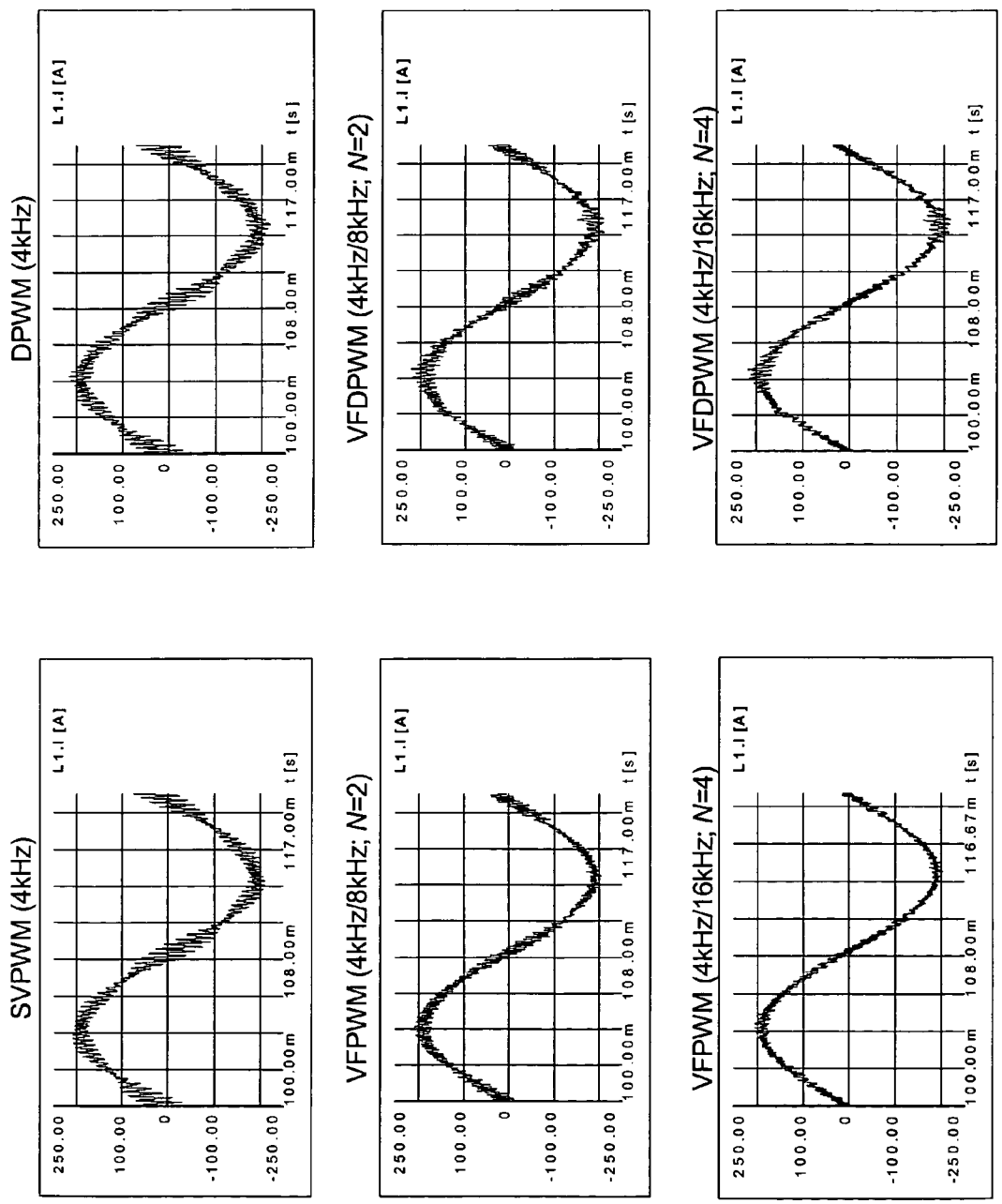
FIG. 7 is a diagram illustrating main inductor current curves for variable frequency PWM techniques of the present invention and prior art static frequency PWM techniques.

FIG. 7 represents the results of a simulation comparing the prior art SVPWM and DPWM techniques to the VFPWM and VFDWM techniques. For the variable frequency techniques, frequency multipliers of N=2 and N=4 were simulated. Referring to FIG. 1, the curves represent the current in the main inductor 36. The variable frequency techniques have noticeable reduced ripple components as compared to the static frequency techniques.

A frequency spectrum analysis of the simulation results reveals that the VFPWM and VFDPWM have almost the same frequency components as that of the SVPWM and DPWM. Thus, the design of the LCL filter 22 for the VFPWM/VFDPWM can be similar to that of the SVPWM/DPWM. Unlike the SVPWM and DPWM, many of the frequency components in the VFPWM/VFDPWM are located at higher switching frequencies. The harmonic components around 4 kHz (i.e., the switching frequency) are significantly smaller than that of the SVPWM/DPWM techniques.

The variable frequency PWM technique of the present invention has numerous advantages. As compared to of the SVPWM and DPWM the switching losses can be further optimized. For example, under unity converter side power factor, the switching loses may be reduced to 60% of that of the DPWM method and around 30% of that of the SVPWM method. The switching PWM frequencies may be selected such that the VFPWM has a similar frequency spectrum as that of the SVPWM/DPWM control methods, obviating the need to redesign the LCL filter 22. Applying the VFPWM technique in the rectifier 12 reduces the ripple current of the main inductor, thereby reducing the core-loss in the main inductor and the ratings of the transistors 36, 38, 40, 42, 44, 46.

Like the DPWM, the VFPWM has significant improvement to the converter when the modulation index is higher. The improvement is not significant when the modulation index is low. Fortunately, for a PWM rectifier system, the modulation index is always very high in steady state ($\approx 1.0$).

Although the present invention is described as it may be implemented in a PWM rectifier, it may also be applied to other PWM applications, such as in the inverter 16. For example, an output inductor may be connected with the inverter. Varying the switching frequency of the inverter based on the reference voltage may reduce the core losses in the output inductor and the core losses of the motor 18.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A rectifier operable to receive a plurality of input voltages each having a phase, comprising:
    a positive bus;
    a negative bus;
    a plurality of main inductors, each coupled to one of the input voltage phases;
    a switching circuit coupled between the positive and negative buses and the main inductors, the switching circuit including a plurality of pairs of switching devices, each pair being associated with one of the input voltage phases;
    a controller operable to control the pairs of switching devices for each phase based on a reference voltage signal for each phase and a switching signal for each phase, the controller varying the frequency of the switching signal for a selected phase based on the value of the reference voltage signal for the selected phase to control ripple currents and power losses associated with switching the plurality of pairs of switching devices; and
    wherein the reference voltage signal for the selected phase has a maximum magnitude and a minimum magnitude, and the controller is operable to set the frequency of the switching signal to a first value during a first interval including the maximum magnitude and set the frequency of the switching signal to a second value during a second interval including the minimum magnitude.

2. A rectifier operable to receive a plurality of input voltages each having a phase, comprising:
    a positive bus;
    a negative bus;
    a plurality of main inductors, each coupled to one of the input voltage phases;
    a switching circuit coupled between the positive and negative buses and the main inductors, the switching circuit including a plurality of pairs of switching devices, each pair being associated with one of the input voltage phases;
    a controller operable to control the pairs of switching devices for each phase based on a reference voltage signal for each phase and a switching signal for each phase, the controller varying the frequency of the switching signal for a selected phase based on the value of the reference voltage signal for the selected phase; and
    wherein the reference voltage signal for the selected phase has a maximum magnitude and a minimum magnitude, and the controller is operable to set the frequency of the switching signal to a first value during a first interval including the maximum magnitude and set the frequency of the switching signal to a second value during a second interval including the minimum magnitude.

3. The rectifier of claim 2, wherein the minimum magnitude comprises zero.

4. The rectifier of claim 2, wherein the second value is greater than the first value.

5. The rectifier of claim 2, wherein the second value is between about 2 and 6 times the first value.

6. The rectifier of claim 2, wherein the controller is operable to set the frequency of the switching signal to a third value during a third interval including neither the maximum magnitude nor the minimum magnitude.

7. The rectifier of claim 6, wherein the first value comprises zero, and the second value is greater than the third value.

8. The rectifier of claim 2, wherein the controller is operable to implement one of a space vector pulse width modulation technique and a discrete pulse width modulation technique.

9. The rectifier of claim 2, further comprising an LCL filter disposed between the main inductors and the phase input voltages.

10. A motor control system, comprising:
    a power supply operable to provide three input signals each having a phase;
    a rectifier operable to receive the three phase input signals and generate a direct current output signal over positive and negative buses, the rectifier implementing a pulse width modulation technique based on a switching signal and a reference voltage signal associated with each of the phases, wherein the rectifier is operable to vary the switching frequency for a selected phase based on a value of the reference voltage signal for the selected phase to reduce ripple currents injected into the positive and negative buses and switching losses associated with pulse width modulation technique;
    an inverter operable to switch between the positive and negative buses to generate a plurality of motor drive signals;
    a motor operable to rotate responsive to the plurality of motor drive signals; and
    wherein the reference voltage signal for the selected phase has a maximum magnitude and a minimum magnitude, and the controller is operable to set the frequency of the switching signal to a first value during a first interval including the maximum magnitude and set the frequency of the switching signal to a second value during a second interval including the minimum magnitude.

11. The rectifier of claim 10, wherein the minimum magnitude comprises zero.

12. The rectifier of claim 10, wherein the second value is greater than the first value.

13. The rectifier of claim 10, wherein the second value is between about 2 and 6 times the first value.

14. The rectifier of claim 10, wherein the controller is operable to set the frequency of the switching signal to a third value during a third interval including neither the maximum magnitude nor the minimum magnitude.

15. The rectifier of claim 14, wherein the first value comprises zero, and the second value is greater than the third value.

16. The rectifier of claim 10, wherein the controller is operable to implement one of a space vector pulse width modulation technique and a discrete pulse width modulation technique.

17. The rectifier of claim 10, wherein the rectifier comprises:
   a plurality of main inductors, each coupled to one of the input voltage phases;
   a switching circuit coupled between the positive and negative buses and the main inductors, the switching circuit including a plurality of pairs of switching devices, each pair being associated with one of the input voltage phases; and
   a controller operable to control the pairs of switching devices for each phase based on the reference voltage signal for each phase and the switching signal for each phase.

18. The rectifier of claim 17, wherein the rectifier further comprises an LCL filter disposed between the main inductors and the phase input voltages.

19. A device, comprising:
   a plurality of switching devices;
   a controller operable to receive a reference voltage signal associated with a first pair of the switching devices, generate a switching signal, control the first pair of switching devices based on the reference voltage signal and the switching signal in accordance with a pulse width modulation technique, and vary a frequency of the switching signal based on the value of the reference voltage signal to control ripple currents and power losses associated with switching the first pair of switching devices; and
   wherein the reference voltage signal has a maximum magnitude and a minimum magnitude and, wherein the controller varies the frequency of the switching signal to have a first frequency during a first interval associated with the maximum magnitude of the reference voltage signal and a second frequency during a second interval associated with the minimum magnitude of the reference voltage signal.

20. A method for controlling a device including a plurality of switching devices operated in accordance with a pulse width modulation technique, comprising:
   receiving a reference voltage signal associated with a first pair of the switching devices;
   generating a switching signal;
   controlling the first pair of switching devices based on the reference voltage signal and the switching signal in accordance with the pulse width modulation technique;
   varying a frequency of the switching signal based on the value of the reference voltage signal to control ripple currents and power losses associated with switching the plurality of pairs of switching devices; and
   wherein the reference voltage signal has a maximum magnitude and a minimum magnitude, and varying the frequency further comprises setting the frequency of the switching signal to a first value during a first interval including the maximum magnitude and setting the frequency of the switching signal to a second value during a second interval including the minimum magnitude.

* * * * *